(12) United States Patent
Ueno

(10) Patent No.: US 11,979,526 B2
(45) Date of Patent: May 7, 2024

(54) DISPLAY APPARATUS, IMAGE FORMING APPARATUS, AND DISPLAY CONTROL METHOD

(71) Applicant: SEIKO EPSON CORPORATION, Tokyo (JP)

(72) Inventor: Kikuo Ueno, Matsumoto-Shup (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/059,997

(22) Filed: Nov. 30, 2022

(65) Prior Publication Data

US 2023/0171352 A1   Jun. 1, 2023

(30) Foreign Application Priority Data

Dec. 1, 2021 (JP) ................................. 2021-195273

(51) Int. Cl.
*H04N 1/00* (2006.01)

(52) U.S. Cl.
CPC ..... *H04N 1/00411* (2013.01); *H04N 1/00392* (2013.01)

(58) Field of Classification Search
CPC .......... H04N 1/00411; H04N 1/00392; H04N 1/00474; H04N 1/00482
See application file for complete search history.

(56) References Cited

U.S. PATENT DOCUMENTS

2011/0102820 A1*  5/2011  Saito .................... G03G 15/011
                                                         358/1.9

FOREIGN PATENT DOCUMENTS

| JP | H11126127 A | 5/1999 |
|---|---|---|
| JP | 2011096051 A | 5/2011 |
| JP | 2020009292 A | 1/2020 |

* cited by examiner

*Primary Examiner* — Brent D Castiaux
(74) *Attorney, Agent, or Firm* — CHIP LAW GROUP

(57) ABSTRACT

A display apparatus includes an operation panel and a controller configured to control display of the operation panel. The controller is configured to cause a first button, a second button, and a display area for displaying a numerical value received by a first operation on one or both of the first button and the second button to be displayed on the operation panel. In response to receiving a second operation on the first button or the second button, the controller is configured to change the amount of change in the numerical value to be received by the first operation.

7 Claims, 8 Drawing Sheets

DISPLAY APPARATUS, IMAGE FORMING APPARATUS, AND DISPLAY CONTROL METHOD

The present application is based on, and claims priority from JP Application Serial Number 2021-195273, filed Dec. 1, 2021, the disclosure of which is hereby incorporated by reference herein in its entirety.

BACKGROUND

1. Technical Field

The present disclosure relates to a display apparatus, an image forming apparatus, and a display control method.

2. Related Art

Techniques that facilitate input of numerical values to a touch panel have been disclosed.

For example, JP-A-2020-9292 discloses a display apparatus including a display controller that causes up and down keys, which are intended to increase and decrease a numerical value displayed in an input field, to be displayed on a display unit. When a user operation using the up and down keys satisfies specific conditions, the display controller causes software ten keys to be displayed on the display unit or causes the numerical value increasing and decreasing rapidly in accordance with the operation using the up and down keys to be displayed.

However, in some cases, when the numerical value increasing and decreasing rapidly in accordance with the operation on the up and down keys is displayed, the displayed numerical value greatly exceeds the target numerical value. In addition, in the case where software ten keys are displayed on the display unit, it may be difficult to implement the displaying of the software ten keys when the display unit is a small-sized touch panel.

SUMMARY

The present disclosure is a display apparatus including a touch panel and a controller configured to control display of the touch panel. The controller is configured to cause a first button, a second button, and a first display area for displaying a numerical value received by a first operation on one or both of the first button and the second button to be displayed on the touch panel. In response to receiving a second operation on the first button or the second button, the controller is configured to change an amount of change in the numerical value to be received by the first operation.

The present disclosure is an image forming apparatus including a touch panel, a controller configured to control display of the touch panel, and an image former configured to form an image on a recording medium. The controller is configured to cause a first button, a second button, and a first display area for displaying a numerical value received by a first operation on one or both of the first button and the second button to be displayed on the touch panel, and to, in response to receiving a second operation on the first button or the second button, change an amount of change in the numerical value received by the first operation.

The present disclosure is a display control method for controlling display of a touch panel. The display control method includes causing a first button, a second button, and a first display area for displaying a numerical value received by a first operation on one or both of the first button and the second button to be displayed on the touch panel, and, in response to receiving a second operation on the first button or the second button, changing an amount of change in the numerical value to be received by the first operation.

DESCRIPTION OF EXEMPLARY EMBODIMENTS

Embodiments according to the present disclosure will be described below with reference to the accompanying drawings.

Figure 1:
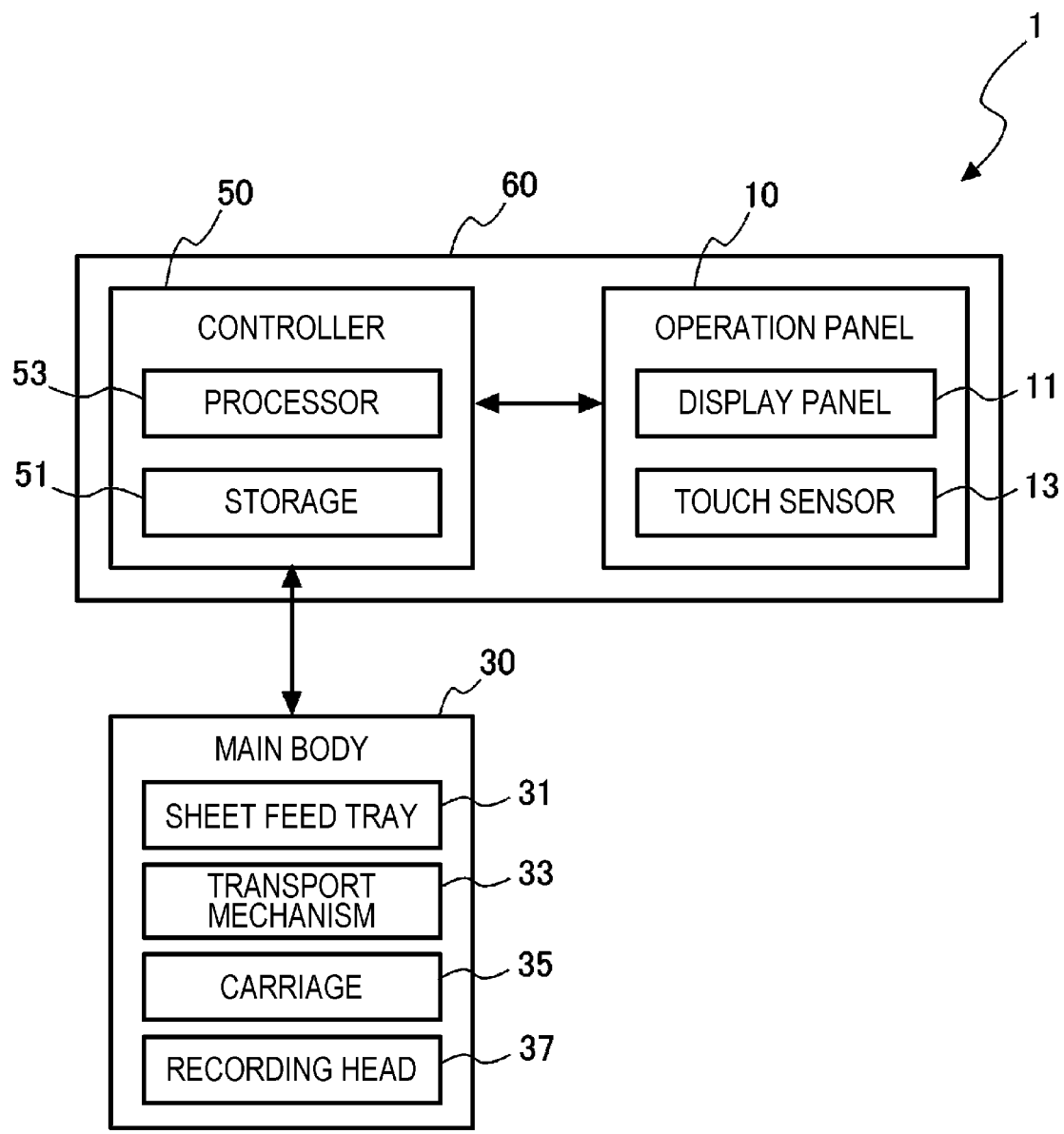
FIG. 1 is a block diagram illustrating a configuration of an image forming apparatus.

FIG. 1 is a block diagram illustrating an example of a configuration of an image forming apparatus 1.

The image forming apparatus 1 includes an operation panel 10, a main body 30, and a controller 50.

The operation panel 10 and the controller 50 other than the main body 30 in the image forming apparatus 1 correspond to a display apparatus 60.

The operation panel 10 is a touch panel including a display panel 11 and a touch sensor 13.

A liquid crystal panel or an organic electroluminescent (EL) panel, for example, is used for the display panel 11. The touch sensor 13, which is arranged to be superimposed on the display panel 11, detects a touch operation on the operation panel 10. The touch sensor 13 detects a touch operation at a location at which a finger of the user touches the operation panel 10. The touch sensor 13 outputs an operation signal including coordinate information, which indicates the location of the detected touch operation, to the controller 50.

The main body 30 includes a sheet feed tray 31, a transport mechanism 33, a carriage 35, and a recording head 37. The main body 30 corresponds to an image former.

A recording medium is stored in the sheet feed tray 31.

The transport mechanism 33 transports a recording medium stored in the sheet feed tray 31.

The carriage 35, on which the recording head 37 is mounted, transports the recording head 37 in a direction perpendicular to the transport direction of a recording medium.

The recording head 37 ejects ink on a recording medium transported by the transport mechanism 33 to form an image on the recording medium.

The controller 50 is a computer device including a storage 51 and a processor 53.

The storage 51 includes a volatile memory, such as a random-access memory (RAM), and a nonvolatile memory, such as a read-only memory (ROM). The RAM is used to temporarily store various types of data and the like, and the ROM stores a control program used for control of operations of the image forming apparatus 1 and various types of setting information.

The processor 53 is a processing device including a central processing unit (CPU) and a micro processing unit (MPU). The processor 53 executes a control program to control components of the image forming apparatus 1.

The controller 50 causes the operation panel 10 to display an operation screen 100. In addition, the controller 50 detects an operation on the operation panel 10 and controls the main body 30 based on the detected operation. For example, the controller 50 receives setting of the number of copies of printing input to the operation panel 10 and causes the main body 30 to print the received number of copies.

Figure 2:
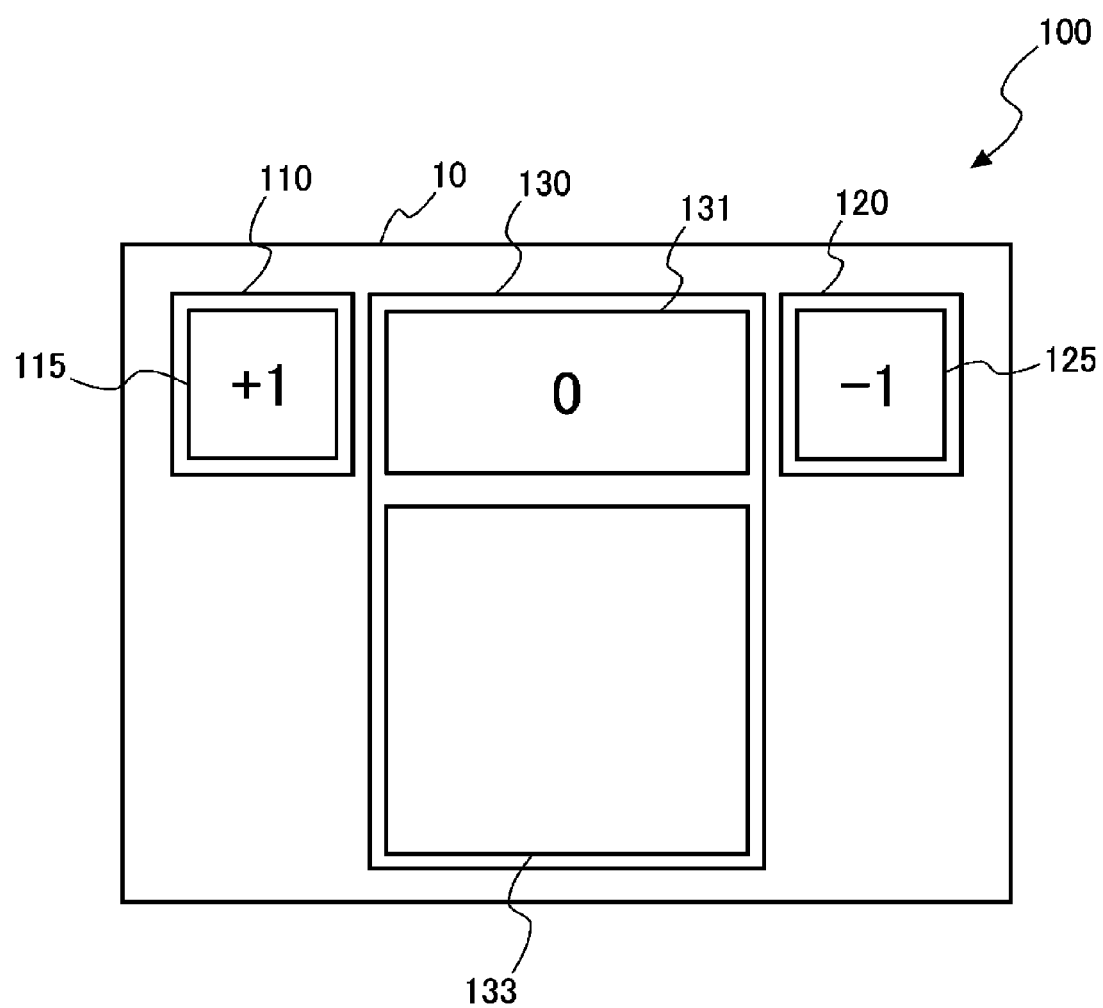
FIG. 2 is a diagram depicting an operation screen displayed on an operation panel.

FIG. 2 is a diagram depicting the operation screen 100 that the controller 50 causes the operation panel 10 to display. The operation screen 100 includes a first button 110, a second button 120, and a display area 130.

The first button 110 is a plus button for increasing a numerical value displayed in the display area 130. The first button 110 includes a digit display area 115. In the digit display area 115, the number of digits set by a user operation is displayed. The digit display area 115 depicted in FIG. 2 displays a state in which the number of digits is set to "1". The digit display area 115 corresponds to a second display area.

The second button 120 is a minus button for decreasing the numerical value displayed in the display area 130. The second button 120 includes a digit display area 125. In the digit display area 125, the number of digits set by the user is displayed. The digit display area 125 depicted in FIG. 2 displays a state in which the number of digits is set to "1". The digit display area 125 corresponds to a second display area.

The display area 130 includes a numerical value area 131 and a candidate area 133. The digit display area 130 corresponds to a first display area.

The numerical value area 131 is an area in which a numerical value input by the user through a touch operation is displayed.

The candidate area 133 displays candidates for the number of digits to be displayed in the digit display area 115 and the digit display area 125. The candidate area 133 may be displayed as a pop-up without the display area being fixed. In addition, in displaying the candidate area 133 as a pop-up, at least a portion of the candidate area 133 may be displayed to overlap any of the numerical value area 131, the first button 110, and the second button 120.

When the first button 110 is short pressed, a numerical value in accordance with the number of digits set on the first button 110 is input. This short press operation corresponds to a first operation. For example, in the case where the number of digits set on the first button 110 is one, "1" is input by short pressing the first button 110 once. In addition, in the case where the number of digits set on the first button 110 is two, "10" is input by short pressing the first button 110 once. In addition, in the case where the number of digits set on the first button 110 is three, "100" is input by short pressing the first button 110 once.

Figure 3:
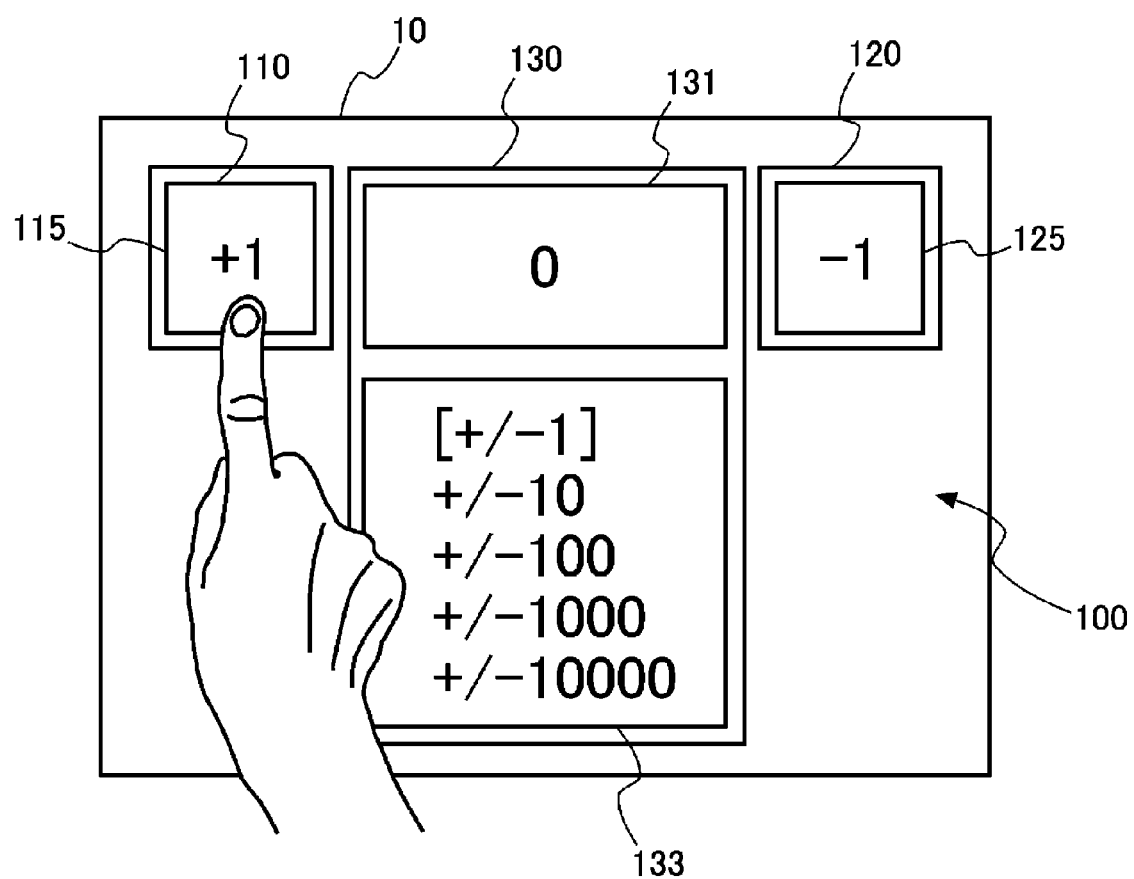
FIG. 3 is a diagram depicting display of a candidate area when a first button is long pressed.

FIG. 3 is a diagram depicting display of the candidate area 133 when the first button 110 is long pressed.

In addition, when the first button 110 is long pressed, candidates for the number of digits to be set on the first button 110 are displayed in the candidate area 133. This long press operation corresponds to a second operation.

In the candidate area 133, for example, [+/−1] is displayed as the first digit, [+/−10] as the second digit, [+/−100] as the third digit, [+/−1000] as the fourth digit, and [+−/−10000] as the fifth digit. The numerical value displayed, as each number of digits, by the long press operation corresponds to the amount of change in a numerical value.

Figure 4:
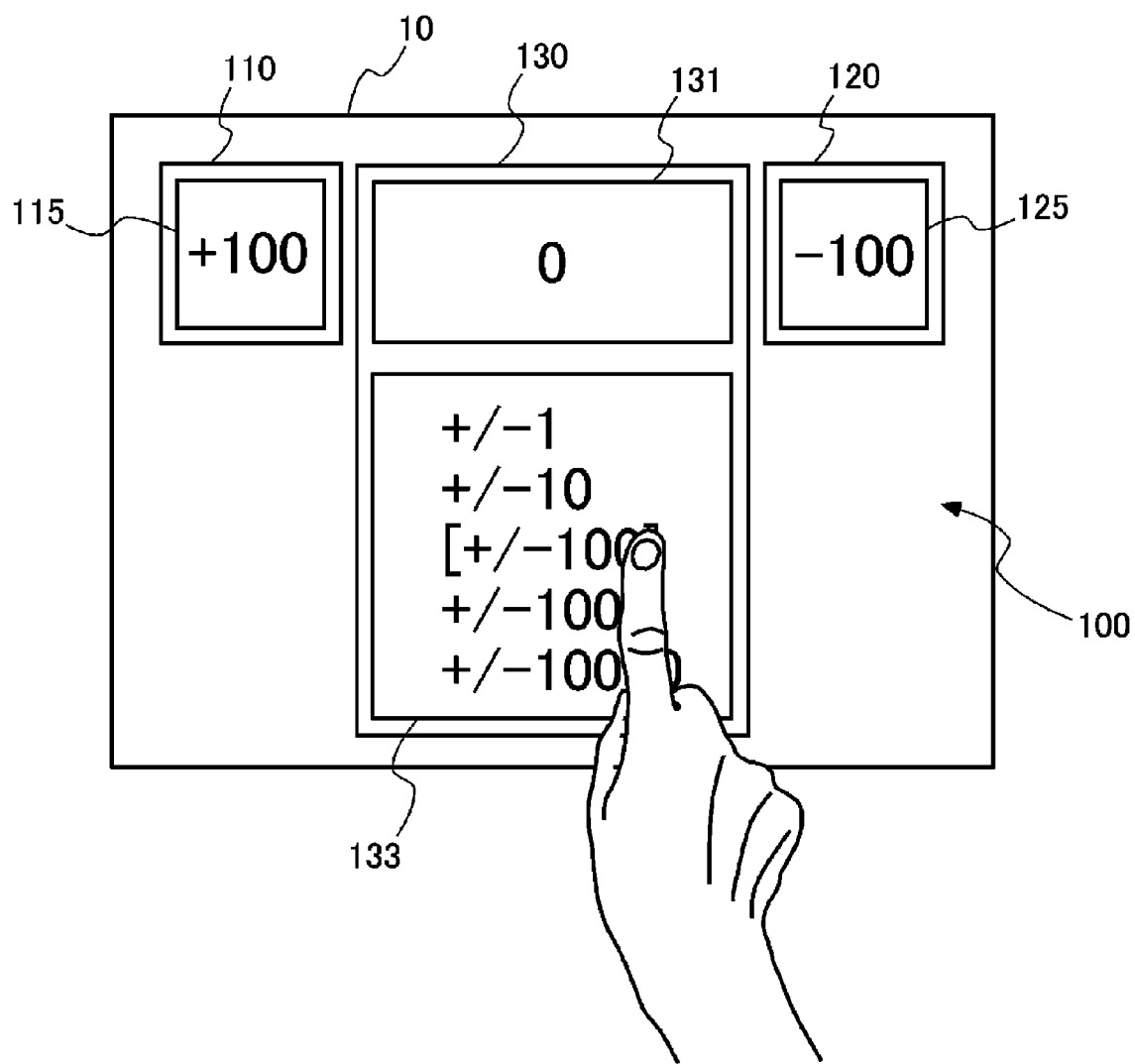
FIG. 4 is a diagram depicting a user operation of selecting the number of digits displayed in the candidate area.

FIG. 4 is a diagram depicting a user operation of selecting the number of digits displayed in the candidate area 133. When candidates for the number of digits are displayed in the candidate area 133 by the user long pressing the first button 110, the user selects one from among the displayed candidates for the number of digits.

For example, in the case where [+/−1] is selected by the user, the controller 50 causes [+1] to be displayed in the digit display area 115 and causes [−1] to be displayed in the digit display area 125.

In addition, in the case where [+/−10] is selected by the user, the controller 50 causes [+10] to be displayed in the digit display area 115 and causes [−10] to be displayed in the digit display area 125.

In addition, in the case where [+/−100] is selected by the user, the controller 50 causes [+100] to be displayed in the digit display area 115 and causes [−100] to be displayed in the digit display area 125.

In addition, in the case where [+/−1000] is selected by the user, the controller 50 causes [+1000] to be displayed in the digit display area 115 and causes [−1000] to be displayed in the digit display area 125.

In addition, in the case where [+/−10000] is selected by the user, the controller 50 causes [+10000] to be displayed in the digit display area 115 and causes [−10000] to be displayed in the digit display area 125.

Description has been given above of the operations made when the first button 110 is long pressed. However, even when the second button 120 is long pressed, the controller 50 performs actions similar to those made when the first button 110 is long pressed.

For example, the case of inputting a numerical value "320" in the numerical value area 131 will be described.

Initially, the user long presses the first button 110 or the second button 120 to cause candidates for the number of digits to be displayed in the candidate area 133.

In response to detecting the long press operation on the first button 110 or the second button 120, the controller 50 causes candidates for the number of digits to be displayed in the candidate area 133.

The user touches a location of the candidate area 133 at which [+/−100] of three digits is displayed. The controller 50 determines a candidate for the number of digits selected based on the detected touch location and causes the display color of the determined candidate for the number of digits to differentiate from the display colors of the other candidates for the number of digits. This enables clear display of the candidate for the number of digits selected by the touch operation.

In addition, when one of the candidates for the number of digits displayed in the candidate area 133 is long pressed, the controller 50 causes the selected candidate for the number of digits to be displayed, as the number of digits to be received by a short press operation, in the digit display areas 115 and 125. Here, the controller 50 causes [+100] to be displayed in the digit display area 115 and [−100] to be displayed in the digit display area 125.

Then, the user taps the first button 110 three times. The controller 50 detects the three taps on the first button 110 and causes a numerical value "300" to be displayed in the numerical value area 131.

Then, the user long presses the first button 110 or the second button 120 again to cause candidates for the number of digits to be displayed in the candidate area 133.

In response to detecting the long press operation on the first button 110 or the second button 120, the controller 50 causes candidates for the number of digits to be displayed in the candidate area 133.

The user touches the location of the candidate area 133 at which [+/−10] of two digits is displayed. The controller 50 determines a candidate for the number of digits selected based on the detected touch location and causes the display color of the determined candidate for the number of digits to differentiate from the display colors of the other candidates for the number of digits. Furthermore, when one of the candidates for the number of digits displayed in the candidate area 133 is long pressed, the controller 50 causes the selected candidate for the number of digits to be displayed, as the number of digits to be received by a short press operation, in the digit display areas 115 and 125. The controller 50 causes [+10] to be displayed in the digit display area 115 and [−10] to be displayed in the digit display area 125.

Then, the user taps the first button 110 twice. The controller 50 detects the two taps on the first button 110 and causes "320" to be displayed in the numerical value area 131.

Figure 5:
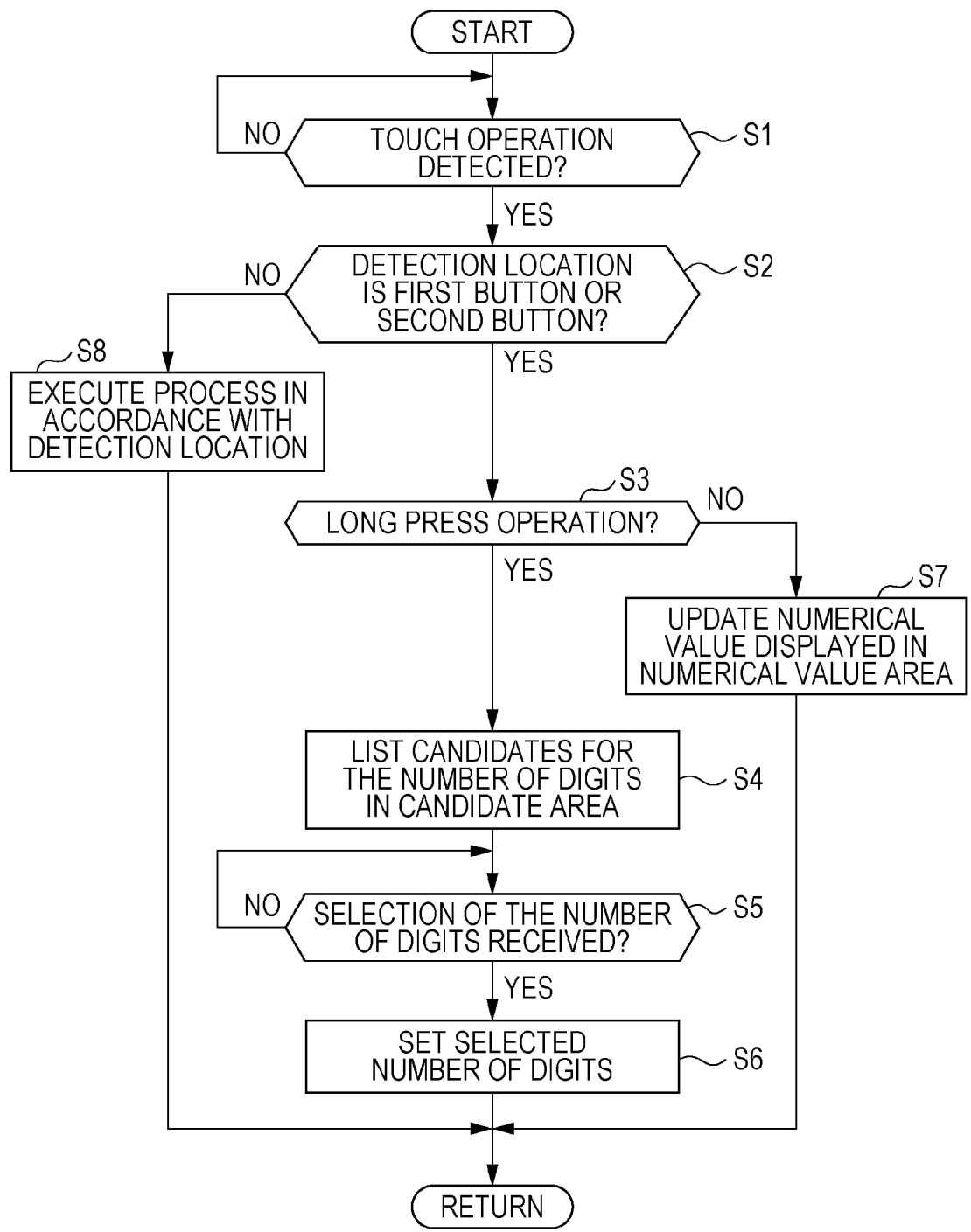
FIG. 5 is a flowchart illustrating operations of an image forming apparatus.

FIG. 5 is a flowchart illustrating operations of the image forming apparatus 1.

With reference to the flowchart in FIG. 5, operations of the image forming apparatus 1 will be described.

First, the controller 50 determines whether a touch operation is detected (step S1). If no touch operation is detected (No in step S1), the controller 50 waits until a touch operation is detected.

If a touch operation is detected (Yes in step S1), the controller 50 determines whether the location of the detected touch operation is a display location of the first button 110 or the second button 120 (step S2).

If the location of the touch operation is the display location of the first button 110 or the second button 120 (Yes in step S2), the controller 50 determines whether a touch operation is a long press operation, by determining whether detection of the touch operation has continued for a predetermined time period or more (step S3).

If it is determined that the touch operation is a long press operation (Yes in step S3), the controller 50 causes candidates for the number of digits to be listed in the candidate area 133 (step S4). Then, the controller 50 determines whether selection of the number of digits is received (step S5). The controller 50 detects a touch operation on the candidate area 133 and determines the number of digits displayed at the location of the detected touch operation, thereby determining the selected number of digits.

If selection of the number of digits is not received (No in step S5), the controller 50 waits until selection of the number of digits is received. In addition, if selection of the number of digits is received (Yes in step S5), the controller 50 causes the selected number of digits to be displayed in the digit display area 115 and in the digit display area 125 (step S6). For example, in response to receiving selection of the number of digits through a touch operation, the controller 50 causes the display color of the candidate of the selected number of digits to differentiate from the display colors of the other candidates for the number of digits. In addition, when one of the candidates for the number of digits displayed in the candidate area 133 is long pressed, the controller 50 causes the number of digits of the selected candidate to be displayed in the digit display area 115 and in the digit display area 125.

In addition, if it is determined in step S3 that the touch operation is not a long press operation but a short press operation (No in step S3), the controller 50 updates the numerical value displayed in the numerical value area 131 (step S7). When the button on which the touch operation is detected is the first button 110, the controller 50 adds a numerical value in accordance with the number of digits set in the digit display area 115. For example, in the case where the number of digits set in the digit display area 115 is two, a value obtained by adding 10 to the numerical value displayed in the numerical value area 131 is displayed as a new numerical value in the numerical value area 131. In addition, in the case where the number of digits set in the digit display area 115 is three, a value obtained by adding 100 to the numerical value displayed in the numerical value area 131 is displayed as a new numerical value in the numerical value area 131.

In addition, when the button on which the touch operation is detected is the second button 120, the controller 50 subtracts a numerical value in accordance with the number of digits set in the digit display area 115. For example, in the case where the number of digits set in the digit display area 125 is two, a value obtained by subtracting 10 from the numerical value displayed in the numerical value area 131 is displayed as a new numerical value in the numerical value area 131. In addition, in the case where the number of digits set in the digit display area 115 is three, a value obtained by subtracting 100 from the numerical value displayed in the numerical value area 131 is displayed as a new numerical value in the numerical value area 131.

In addition, if it is determined in step S2 that the detection location is neither the first button 110 nor the second button 120, the controller 50 executes a process in accordance with the location at which the touch operation is detected (step S8). For example, when the touch operation is a confirmation operation, the controller 50 instructs the main body 30 to print copies, the number of which corresponds to a numerical value displayed in the numerical value area 131.

First Modification

Figure 6:
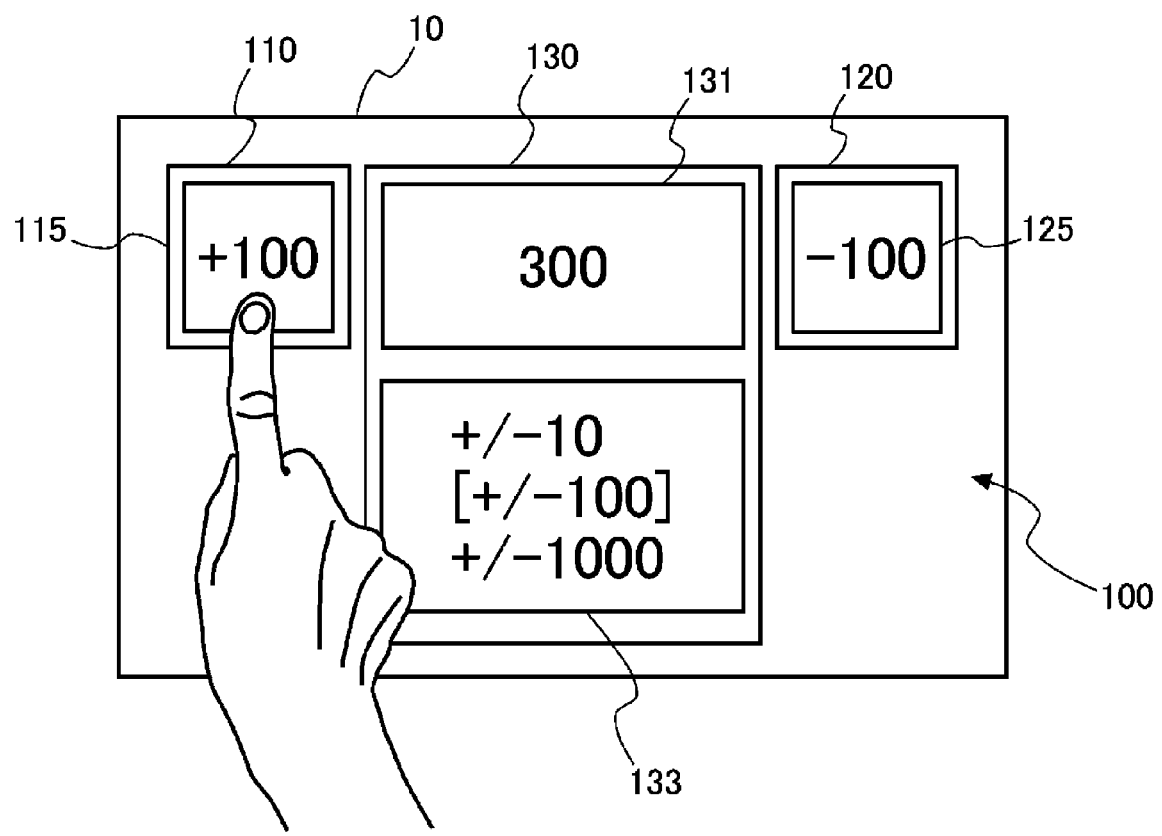
FIG. 6 is a diagram depicting candidates for the number of digits displayed in a candidate area.

FIG. 6 is a diagram depicting candidates for the number of digits displayed in the candidate area 133 in a first modification.

In the embodiment described above, candidates of all the numbers of digits are displayed in the candidate area 133.

In the first modification, the number of digits that is one greater than, and the number of digits that is one smaller than, the number of digits set on the first button 110 and the second button 120 are displayed in the candidate area 133.

For example, in the case where the number of digits displayed in the digit display areas 115 and 125 is three, [+/−10], which is a two-digit candidate, and [+/−1000], which is a four-digit candidate, are displayed in the candidate area 133. Accordingly, the number of candidates for the number of digits displayed in the candidate area 133 is reduced. This enables a reduction in the size of the candidate area 133 to enable a reduction in the size of the display area 130.

Second Modification

In the embodiment described above, candidates for the number of digits are displayed in the candidate area 133. In a second modification, when the first button 110 is long pressed, the number of digits increments once every unit time period.

For example, assume that the number of digits on the first button 110 is set to "+1", which indicates a one-digit number, and the number of digits on the second button 120 is set to "−1", which indicates a one-digit number. When a long press operation on the first button 110 is detected for a unit time period, the controller 50 changes the number of digits displayed in the digit display area 115 to "+10" and changes the number of digits displayed in the digit display area 125 to "−10".

Furthermore, in a situation where a long press operation on the first button 110 is continuously detected, when, after the number of digits in the digit display area 115 has been changed to "+10", a long press operation on the first button 110 is detected for the unit time period, the controller changes the number of digits displayed in the digit display area 115 to "+100". In addition, the controller 50 changes the number of digits displayed in the digit display area 125 to "−100".

Similarly, in a situation where a long press operation on the first button 110 is detected, when, after the number of digits in the digit display area 115 has been changed to "+100", a long press operation on the first button 110 is detected for the unit time period, the controller 50 changes the number of digits displayed in the digit display area 115 to "+1000". In addition, the controller 50 changes the number of digits displayed in the digit display area 125 to "−1000".

In addition, in the second modification, when the second button 120 is long pressed, the number of digits is decremented once every unit time period.

For example, assume that the number of digits on the first button 110 is set to "+1000", which indicates third-digit numbers, and the number of digits on the second button 120 is set to "−1000", which also indicates third-digit numbers.

When a long press operation on the second button 120 is detected for a unit time period, the controller 50 changes the number of digits displayed in the digit display area 115 to "+100" and changes the number of digits displayed in the digit display area 125 to "−100".

Furthermore, in a situation where a long press operation on the second button 120 is continuously detected, when, after the numbers of digits in the digit display areas 115 and 125 have been changed, a long press operation on the second button 120 is detected for the unit time period, the controller changes the number of digits displayed in the digit display area 115 to "+10". In addition, the controller 50 changes the number of digits displayed in the digit display area 125 to "−10".

Similarly, in a situation where a long press operation on the second button 120 is continuously detected, when, after the numbers of digits in the digit display areas 115 and 125 have been changed, a long press operation on the second button 120 is detected for the unit time period, the controller 50 changes the number of digits displayed in the digit display area 115 to "+1". In addition, the controller 50 changes the number of digits displayed in the digit display area 125 to "−1".

In the second modification, it is unnecessary to provide the candidate area 133 in the display area 130, and therefore the candidate area 133 is unnecessary, which may reduce the size of the display area 130.

Third Modification

In the embodiment described above, description has been given of the case where the second operation is a long press operation on the first button 110 or the second button 120. However, the second operation may be a flick operation on the first button 110 or the second button 120.

Figure 7:
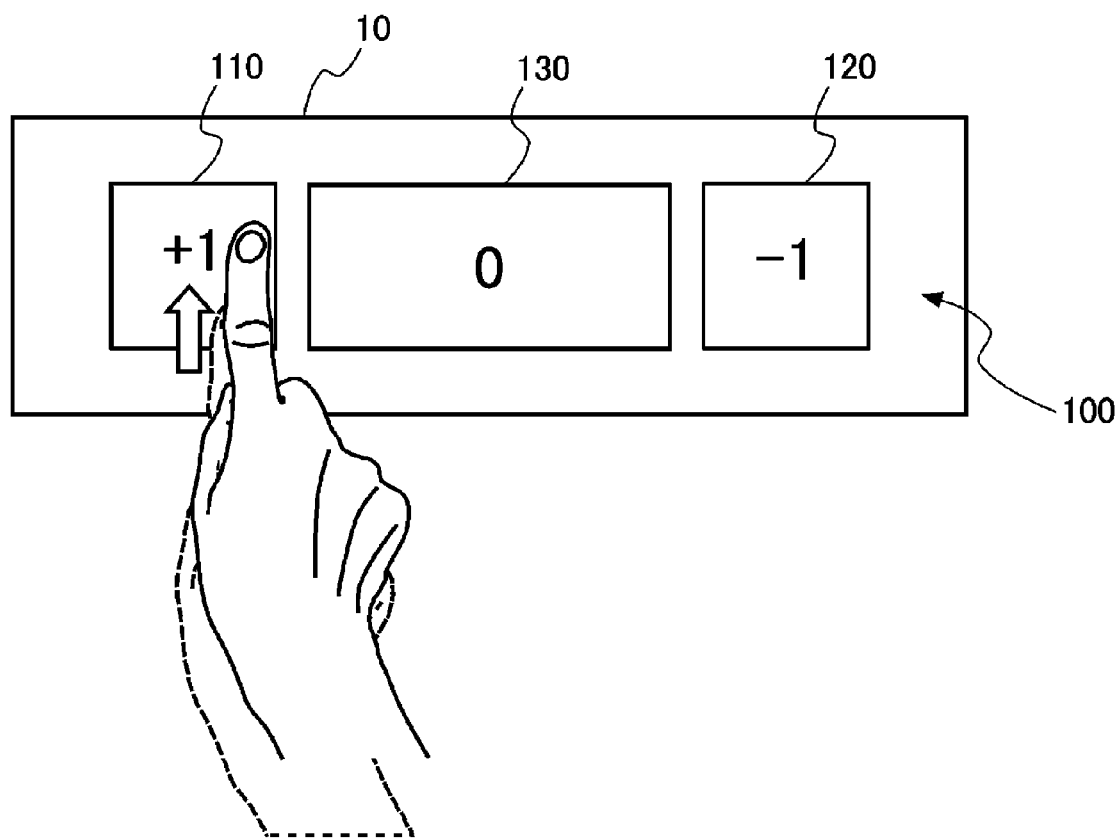
FIG. 7 is a diagram depicting a flick operation on a first button.
Figure 8:
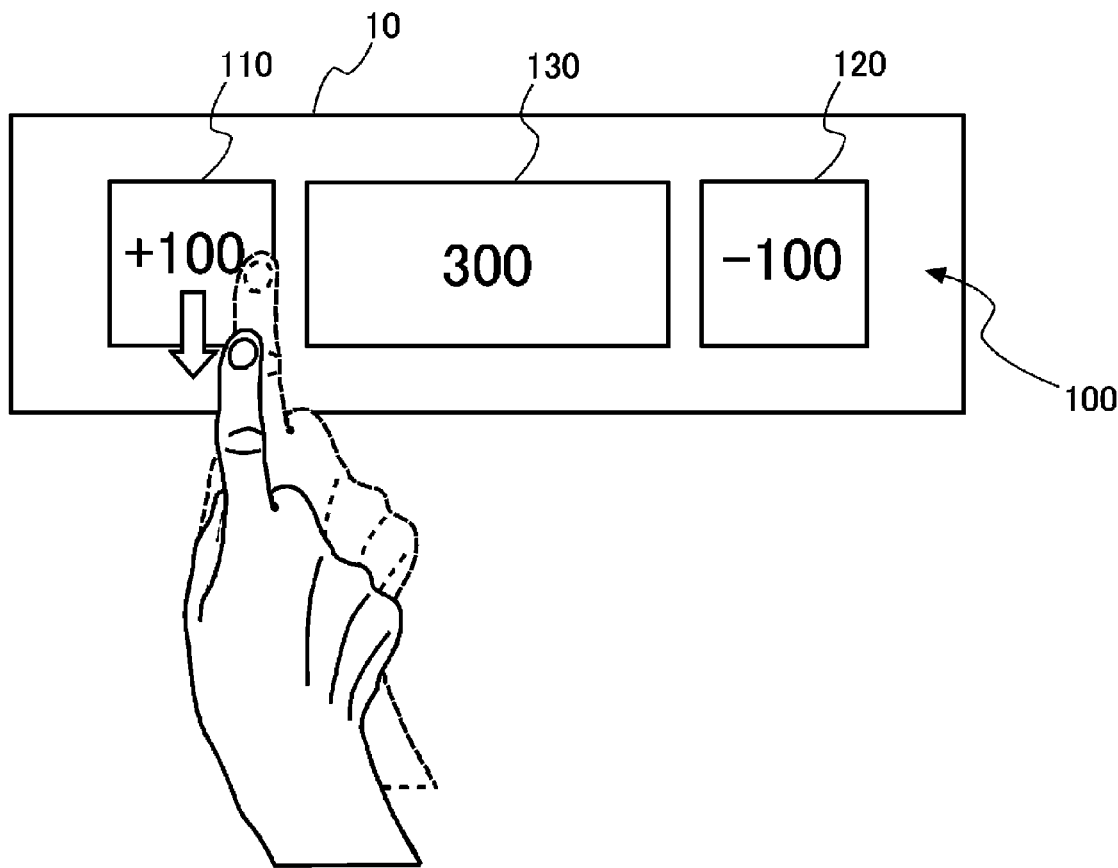
FIG. 8 is a diagram depicting a flick operation on the first button.

FIG. 7 and FIG. 8 are diagrams depicting flick operations on the first button 110.

In response to detecting an operation of moving a finger upward on the first button 110 or the second button 120 as depicted in FIG. 7, the controller 50 changes the numbers of digits in the digit display areas 115 and 125 to the numbers of digits each incremented by one. For example, assume that the number of digits displayed in the digit display area 115 is "+10" and the number of digits displayed in the digit display area 125 is "−10" and that a flick operation of moving a finger upward on the first button 110 or the second button 120 is detected.

In this case, the controller 50 changes the numbers of digits set on the first button 110 and the second button 120 to the numbers of digits each incremented by one and thus changes the number of digits displayed in the digit display area 115 to "+100". The controller 50 also changes the number of digits displayed in the digit display area 125 to "−100".

In addition, in response to detecting an operation of moving a finger downward on the first button 110 or the second button 120 as depicted in FIG. 8, the controller 50 changes the numbers of digits in the digit display areas 115 and 125 to the numbers of digits each decremented by one.

For example, assume that the number of digits displayed in the digit display area 115 is "+100" and the number of digits displayed in the digit display area 125 is "−100" and that a flick operation of moving a finger downward on the first button 110 or the second button 120 is detected.

In this case, the controller 50 changes the numbers of digits set on the first button 110 and the second button 120 to the numbers of digits each decremented by one and thus changes the number of digits displayed in the digit display area 115 to "+10". The controller 50 also changes the number of digits displayed in the digit display area 125 to "−10".

In the third modification, it is unnecessary to provide the candidate area 133 in the display area 130, and therefore the candidate area 133 is unnecessary, which may reduce the size of the display area 130.

Fourth Modification

In the embodiment and first to third modifications described above, description has been given of the case where the first button 110 and the second button 120 are software buttons displayed on the operation panel 10.

A fourth modification is an example in which the first button 110 and the second button 120 are constituted by hardware buttons.

With the first button 110 and second button 120 constituted by hardware buttons, the digit display area 115 may not be displayed on the first button 110 and the digit display area 125 may not be displayed on the second button 120.

Figure 9:
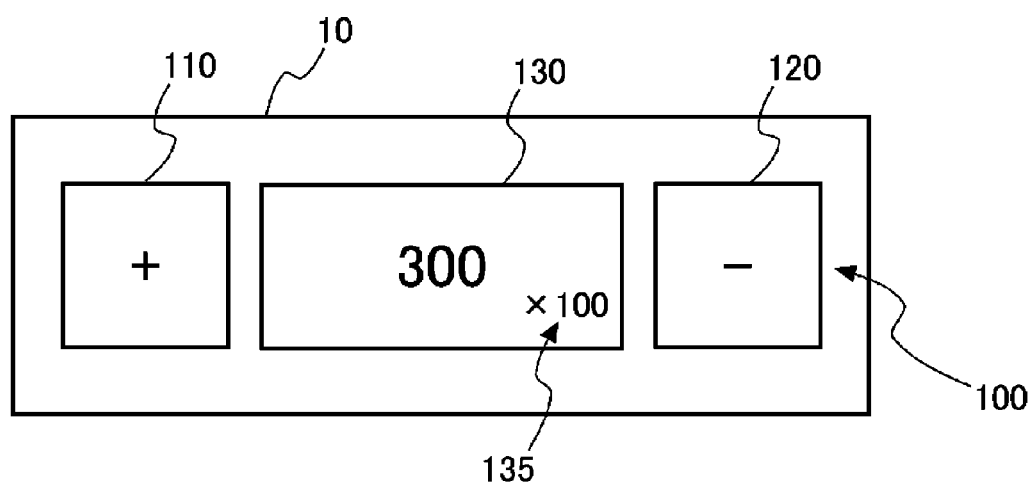
FIG. 9 is a diagram depicting an operation screen displayed on the operation panel.

FIG. 9 is a diagram depicting the operation screen 100 displayed on the operation panel 10 in the fourth modification.

In the fourth modification, a plus symbol, which indicates that the first button 110 is an increase button, is displayed on the first button 110, and a minus symbol, which indicates that the second button 120 is a decrease button, is displayed on the second button 120. In addition, instead of the numbers of digits displayed in the digit display area 115 and the digit display area 125, a multiplying factor display portion 135 is provided in the numerical value area 131 and a multiplying factor is displayed in the multiplying factor display portion 135.

The multiplying factor displayed in the multiplying factor display portion 135 may be changed by a long press operation on the first button 110 or the second button 120.

When a long press operation on the first button 110 is detected, the controller 50 changes the multiplying factor displayed in the multiplying factor display portion 135 to a multiplying factor that is ten times the displayed multiplying factor. For example, when, with a multiplying factor of "×10" displayed in the multiplying factor display portion 135, a long press operation on the first button 110 is detected, the controller 50 changes the displayed multiplying factor to a multiplying factor of 100 times and causes "×100" to be displayed in the multiplying factor display portion 135.

In addition, when a long press operation on the second button 120 is detected, the controller 50 changes the multiplying factor displayed in the multiplying factor display portion 135 to a multiplying factor that is one-tenth of the displayed multiplying factor. For example, when, with a multiplying factor of "×100" displayed in the multiplying factor display portion 135, a long press operation on the second button 120 is detected, the controller 50 changes the displayed multiplying factor to a multiplying factor of 10 times and causes "×10" to be displayed in the multiplying factor display portion 135.

As described above, the display apparatus 60 or the image forming apparatus 1 according to the present embodiment includes the operation panel 10, which is a touch panel, and the controller 50 that controls display of the operation panel 10.

The controller 50 causes the first button 110, the second button 120, and the display area 130 for displaying a numerical value received by the first operation on one or both of the first button 110 and the second button 120 to be displayed on the operation panel 10.

In addition, in response to receiving the second operation on the first button 110 or the second button 120, the controller 50 changes the amount of change in the numerical value to be received by the first operation.

Accordingly, the data amount displayed in the display area 130 used for display may be reduced compared with the case where ten keys are displayed in the display area 130, which enables a reduction in size of the display area 130. In addition, the amount of change in the numerical value input by the first operation is changed by the second operation on the first button 110 or the second button 120. Therefore, an even larger numerical value may be easily input via the first button 110 or the second button 120, which enables improved usability.

The first button 110 and the second button 120 include the digit display area 115 and the digit display area 125, respectively.

In response to receiving the second operation, the controller 50 causes a plurality of candidates for the number of digits to be displayed in the first display area 130. When any one of the plurality of candidates for the number of digits displayed in the display area 130 is selected, the controller 50 causes the selected candidate for the number of digits to be displayed, as the number of digits to be received by a first operation, in the digit display area 115 and in the digit display area 125.

Accordingly, the number of digits to be received by the first operation is displayed in the digit display area 115 and the digit display area 125 of the first button 110 and the second button 120, which facilitates confirmation of the number of digits of a numerical value to be input during input of the numerical value by the first operation.

In response to receiving a second operation, the controller 50 receives a change in the number of digits as the amount of change in the numerical value.

The controller 50 causes the number of digits obtained by incrementing, by one, the displayed number of digits in each of the digit display area 115 and the digit display area 125 and the number of digits obtained by decrementing, by one, the displayed number of digits to be displayed in the digit display area 130.

Accordingly, the number of candidates for the number of digits displayed in the display area 130 may be reduced, and the data amount displayed in the display area 130 may be reduced. This enables a reduction in the size of the display area 130.

The first button 110 is a button for increasing a numerical value, and the second button 120 is a button for decreasing a numerical value.

In response to receiving a second operation, the controller 50 receives a change in the number of digits as the amount of change in the numerical value. The controller 50 increments the number of digits once every unit time period while the second operation on the first button 110 is being detected, and decrements the number of digits once every unit time period while the second operation on the second button 120 is being detected.

Accordingly, the number of digits of a numerical value to be input by a first operation may be changed in the direction of increment by changing the time period for which the first button 110 is long pressed. In addition, the number of digits of a numerical value to be input by a first operation may be changed in the direction of decrement by changing the time period for which the second button 120 is long pressed. Therefore, the usability may be improved.

The controller 50 detects, as a second operation, a long press operation, or a flick operation, on one of the first button 110 and the second button 120.

Accordingly, the number of digits of a numerical value input by a first operation may be changed by a long press operation or a flick operation on the first button 110 or the second button 120, which enables improved usability.

The embodiment described above illustrates an aspect and may be modified and applied in any manner.

For example, in the embodiment described above, description has been given of the case where the number of copies of printing for causing the main body 30 to perform is input by a touch operation on the operation panel 10. However, the numerical value that is input to the operation panel 10 may be the date and time, the date of birth, or an Internet protocol (IP) address.

For example, in the case of inputting the date and time to the operation panel 10, in response to receiving a second operation, the controller 50 changes an amount of change in the numerical value to be received by a first operation to "day" or "time".

In addition, in the case of inputting the date of birth to the operation panel 10, in response to receiving a second operation, the controller 5 changes the amount of change in the numerical value to be received by a first operation to "year", "month" or "day".

In addition, components illustrated in FIG. 1 are exemplary and are non-limiting. Hardware individually corresponding to each functional unit may not be implemented, and the configuration may, of course, be such that the functions of components are implemented by a single processor executing programs. Some of the functions implemented by software may be hardware. Alternatively, some of the functions implemented by hardware may be implemented by software. In addition, the specific detailed configurations of the other components of the devices of the image forming apparatus 1 may be changed in any manner.

When a display control method is implemented by using a computer mounted on the image forming apparatus 1, a program to be executed by the computer may be provided in a manner such as a recording medium or a transmission medium for transmitting the program. As the recording medium, a magnetic or optical recording medium or a semiconductor memory device may be used. Examples of the recording medium include portable or fixed recording media such as a floppy disk, a hard disk drive (HDD), a compact disc read-only memory (CD-ROM), a digital versatile disc (DVD), a Blu-ray disc, a magneto-optical disc, a flash memory, and a card type recording medium. The recording medium mentioned above may be a nonvolatile storage device, such as a RAM, ROM, or HDD, which is an internal storage device included in a server device. Blu-ray is a registered trademark.

The step units of operations illustrated in FIG. 5 are those into which the processing of devices of the image forming apparatus 1 is divided according to the main processing content for ease of understanding and will not be limited by how the processing is divided into units and what are the names of the units. The processing may be divided into more step units according to the processing content. The processing may be divided such that one step unit includes more processing. The order of steps may be rearranged as appropriate.

What is claimed is:

1. A display apparatus comprising:
a touch panel; and
a controller configured to:
control display of the touch panel;
cause a first button, a second button, and a first display area for displaying a numerical value, received by a first operation on one or both of the first button and the second button, to be displayed on the touch panel;
in response to receiving a second operation on the first button or the second button, change an amount of change in the numerical value to be received by the first operation; and
in response to receiving the second operation, cause a plurality of candidates for the amount of change in the numerical value to be displayed concurrently in the first display area.

2. The display apparatus according to claim 1, wherein the first button and the second button include a second display area, and
the controller is configured to, when any one candidate of the plurality of candidates for the amount of change in the numerical value displayed in the first display area is selected, cause the selected candidate for the amount of change to be displayed, as the amount of change in the numerical value to be received by the first operation, in the second display area.

3. The display apparatus according to claim 2, wherein the controller is configured to:

in response to receiving the second operation, receive a change in a number of digits as the amount of change in the numerical value, and
cause a first number of digits obtained by incrementing, by one, a number of displayed digits in the second display area to be displayed, and
cause a second number of digits obtained by decrementing, by one, a number of displayed digits in the first display area to be displayed.

4. The display apparatus according to claim 2, wherein the first button is a button for increasing the numerical value,
the second button is a button for decreasing the numerical value, and
the controller is configured to:
in response to receiving the second operation, receive a change in a number of digits as the amount of change in the numerical value,
while the second operation on the first button is being detected, increment the number of digits once every unit time period, and
while the second operation on the second button is being detected, decrement the number of digits once every unit time period.

5. The display apparatus according to claim 1, wherein the controller is configured to detect, as the second operation, a long press operation, or a flick operation, on one of the first button and the second button.

6. An image forming apparatus, comprising:
a touch panel;
an image former configured to form an image on a recording medium; and
a controller configured to:
control display of the touch panel;
cause a first button, a second button, and a first display area for displaying a numerical value received by a first operation on one or both of the first button and the second button to be displayed on the touch panel;
in response to receiving a second operation on the first button or the second button, change an amount of change in the numerical value received by the first operation; and
in response to receiving the second operation, cause a plurality of candidates for the amount of change in the numerical value to be displayed concurrently in the first display area.

7. A display control method for controlling display of a touch panel, the display control method comprising:
causing a first button, a second button, and a first display area for displaying a numerical value received by a first operation on one or both of the first button and the second button to be displayed on the touch panel;
in response to receiving a second operation on the first button or the second button, changing an amount of change in the numerical value to be received by the first operation; and
in response to receiving the second operation, causing a plurality of candidates for the amount of change in the numerical value to be displayed concurrently in the first display area.

* * * * *